United States Patent [19]
Luo et al.

[11] Patent Number: 5,892,837
[45] Date of Patent: Apr. 6, 1999

[54] COMPUTER PROGRAM PRODUCT FOR LOCATING OBJECTS IN AN IMAGE

[75] Inventors: Jiebo Luo; Robert T. Gray, both of Rochester, N.Y.

[73] Assignee: Eastman Kodak Company, Rochester, N.Y.

[21] Appl. No.: 919,561

[22] Filed: Aug. 29, 1997

[51] Int. Cl.⁶ .............................. G06K 9/00; G06K 9/36
[52] U.S. Cl. ........................... 382/117; 382/118; 382/291
[58] Field of Search .................................. 382/117, 118, 382/128, 291; 351/206, 208, 209, 210

[56] References Cited

U.S. PATENT DOCUMENTS

| | | | |
|---|---|---|---|
| 4,641,349 | 2/1987 | Flom et al. | 351/206 |
| 5,231,674 | 7/1993 | Cleceland et al. | 351/210 |
| 5,293,427 | 3/1994 | Ueno et al. | 382/117 |
| 5,471,542 | 11/1995 | Ragland | 382/128 |
| 5,570,698 | 11/1996 | Liang et al. | 351/206 |
| 5,680,481 | 10/1997 | Prasad et al. | 382/118 |
| 5,715,325 | 2/1998 | Bang et al. | 382/118 |
| 5,790,225 | 8/1998 | Kirschbaum | 351/210 |

FOREIGN PATENT DOCUMENTS

| | | | |
|---|---|---|---|
| 2231699 | 11/1990 | United Kingdom | A61B 5/117 |

OTHER PUBLICATIONS

Marcone et al. "Automatic face image recognition: an accurate eye location procedure" DSP 97, 1997 13th International Conference vol. 2 pp. 515–19, Jul. 1997.

*Primary Examiner*—Jon Chang
*Assistant Examiner*—Jingge Wu
*Attorney, Agent, or Firm*—Peyton C. Watkins

[57] ABSTRACT

A computer program product for locating first and second objects each having substantially the same physical characteristics, and the ratio of the distance between the first and second objects and the size of each object is substantially invariant, the computer program product comprises: a computer readable storage medium having a computer program stored thereon for performing the steps of: displaying a digital image on a graphical user interface; inputting to the interface an approximate position of each object for forming initial input positions; determining an estimate size of each object based on the distance obtained from the initial input positions of the first and second objects; forming a first searching window for the first object; the center of the first window is determined by the input position of the first object and the size of the first window is determined by the estimate size of the first object; reiteratively positioning a template on the first search window for determining a location that gives a best match of the first object relative to the template; forming a second searching window for the second object; the center of the second window is determined by the input position of the second object and the size of the second window is determined by the estimate size of the second object; and reiteratively positioning a template on the second search window for determining a location that gives a best match of the second object relative to the template.

107 Claims, 11 Drawing Sheets

θ1: orientation of the first object (in this case negative)
θ2: orientation of the second object (in this case positive)
θ : orientation of the line connecting the centers of the first and second objects
d : distance between the centers of the first and second objects
s1 : size of the first object
s2 : size of the second object

FIG. 2a1

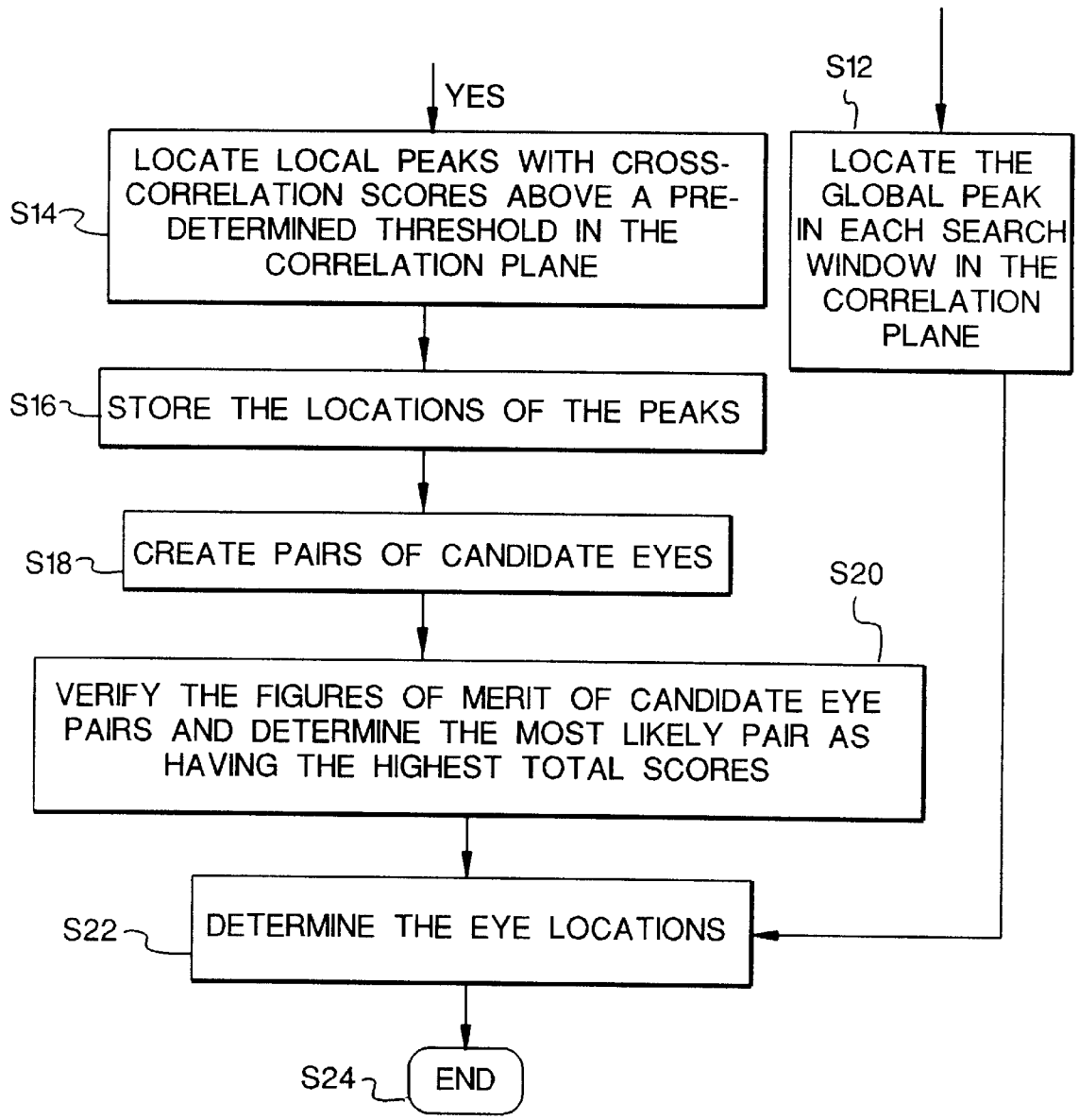
FIG. 2a2

FIG. 2b
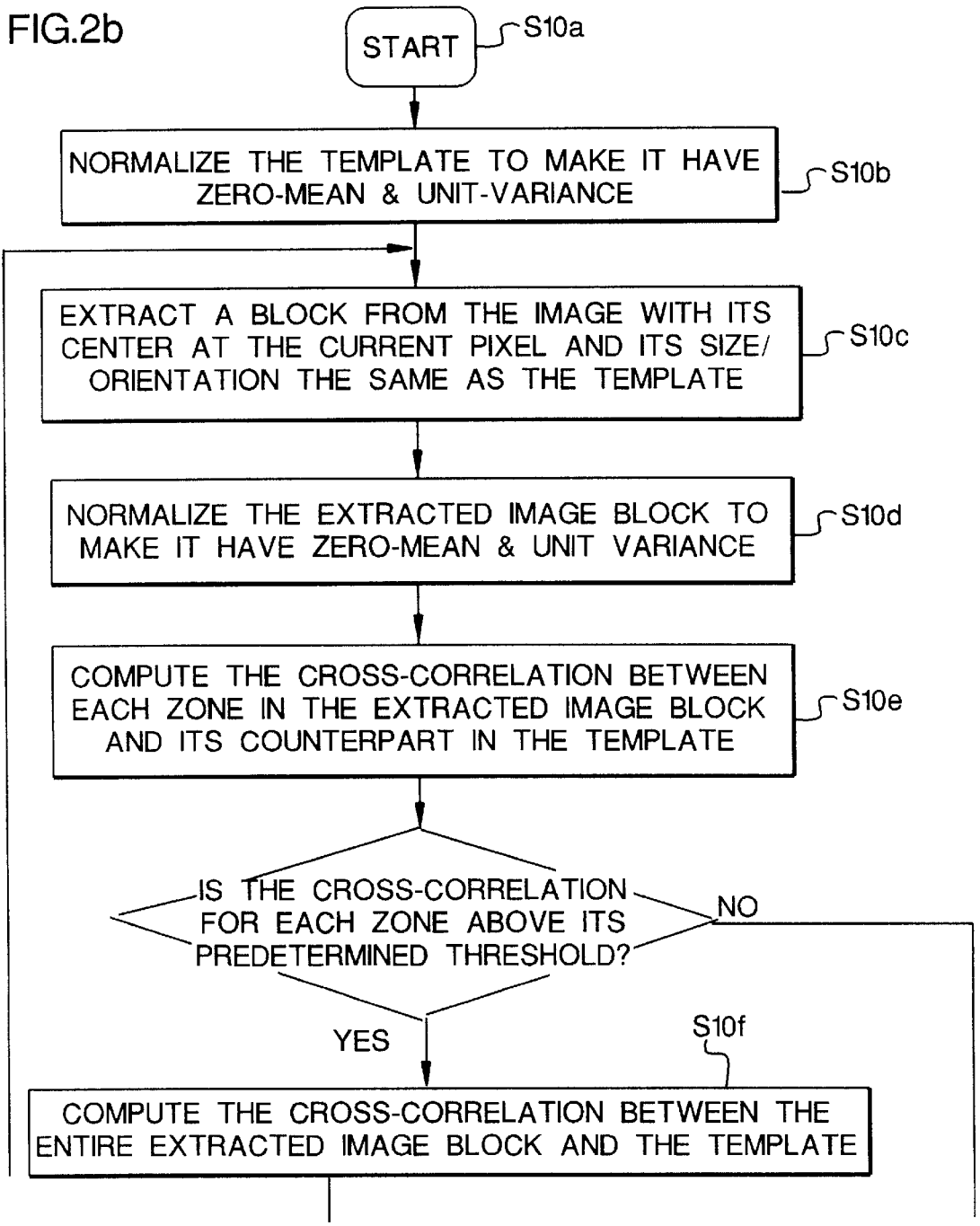
FIG. 2b1

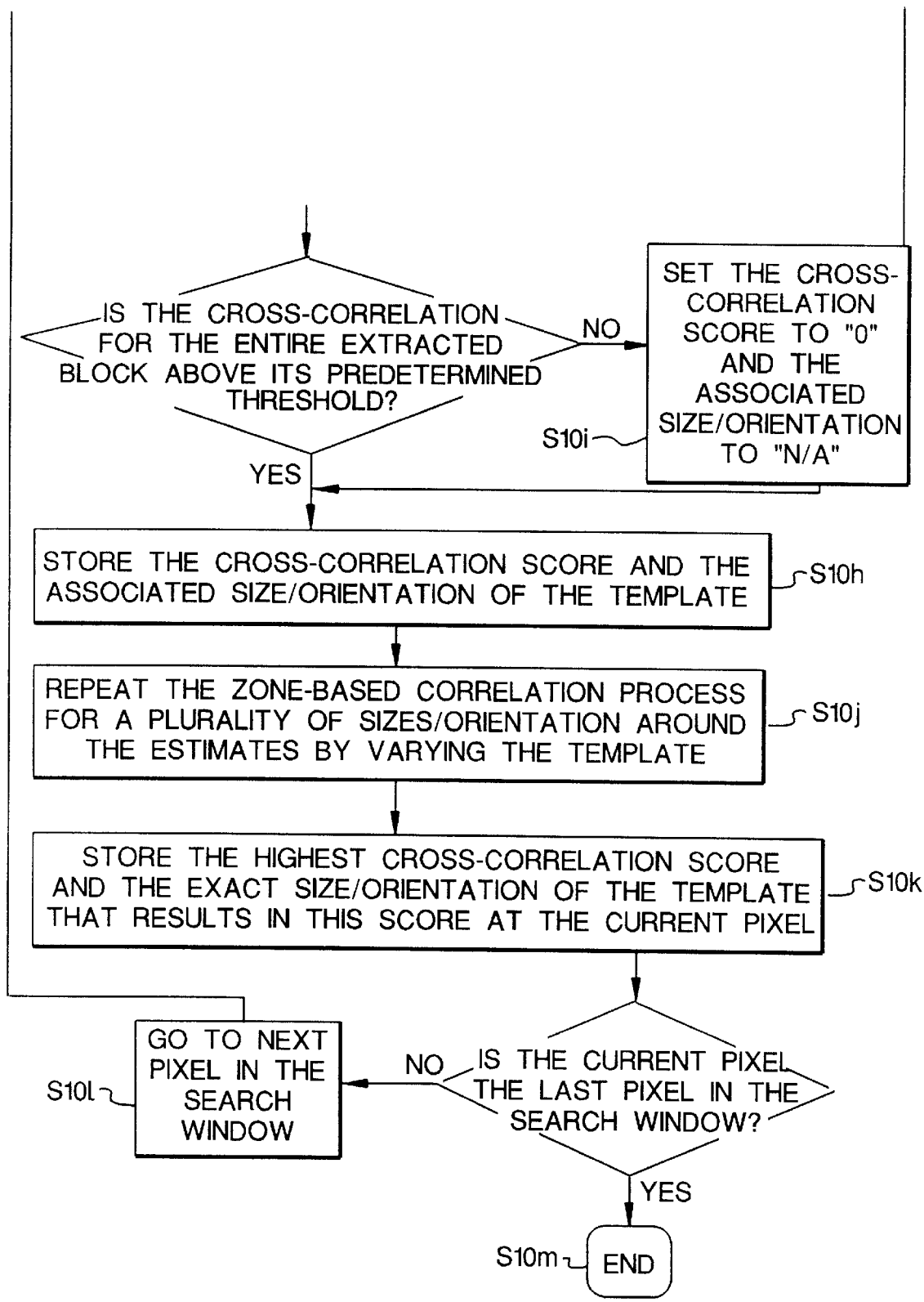
FIG. 2B2

θ1: orientation of the first object (in this case negative)
θ2: orientation of the second object (in this case positive)
θ : orientation of the line connecting the centers of the first and second objects
d : distance between the centers of the first and second objects
s1 : size of the first object
s2 : size of the second object A PREFERRED SCORING FUNCTION f(x)

COMPUTER PROGRAM PRODUCT FOR LOCATING OBJECTS IN AN IMAGE

CROSS REFERENCE TO RELATED APPLICATIONS

The present invention is related to U.S. patent application Ser. No. 08/919,560 filed Aug. 29, 1997 entitled A COMPUTER PROGRAM PRODUCT FOR REDEYE DETECTION to Schildkraut et al, and U.S. patent application Ser. No. 08/920,844 filed Aug. 29, 1997 entitled METHOD FOR AUTOMATIC DETECTION OF HUMAN EYES IN DIGITAL IMAGES to Jiebo Luo, and assigned to the assignee of the present invention.

APPENDIX

The disclosure in the appendix of this patent disclosure of this patent document contains material to which a claim of copyright protection is made. The copyright owner has no objection to the facsimile reproduction of any one of the patent documents or the patent disclosure, as it appears in the U.S. Patent and Trademark Office patent file or records, but reserves all other rights whatsoever.

FIELD OF THE INVENTION

The invention relates generally to the field of digital image processing and, more particularly, to locating objects in a digital image based on user input identifying a portion of the image that contains the objects of interest.

BACKGROUND OF THE INVENTION

Identifying objects in an image is performed in a variety of image processing functions. For example, in correcting for red-eye in images, the human eye is located and the undesirable red portion in the eye is replaced with a more aesthetically pleasing color. In the "KODAK" digital print station, the image is displayed on a touch screen and one eye is repeatedly touched for further zooming in on the red portion of the eye upon each touch. The red portion of the eye is then identified by searching for red pixels in the area defined by the zooming process, and the identified red pixels are replaced with a predetermined color for making the image more aesthetically pleasant. The process is then repeated for the other eye.

A neural networks method of locating human eyes is disclosed in *Learning An Example Selection for Object and Pattern Recognition,* The AI-Lab, MIT by K. K. Sung, November 1995. This method discloses training the a neural network to recognize eyes with acceptable distortion from a pre-selected eye template. The operator repeatedly distorts the original eye template and all variations produced from distorting the eye are labeled as either acceptable or unacceptable. The distorted samples, i.e., the training images, and the associated labeling information are fed to the neural network. This training process is repeated until the neural network has achieved satisfactory recognition performance for the training images. The trained neural network effectively has stored a plurality of possible variations of the eye. Locating an eye is done by feeding a region in the image to the neural network for determining if a desired output, i.e., a match, occurs; all matches are identified as an eye.

Although the presently known and utilized methods of identifying eyes are satisfactory, they are not without drawbacks. The touch screen method requires constant human interaction of repeatedly touching the touch screen for zooming in on the eye and, as a result, is somewhat labor intensive. Still further, the neural network method requires extensive training and is also computationally intensive in the matching process because an exhaustive search has to be performed for all the possible sizes and orientations of the eye.

Consequently, a need exists for improvements in the method of locating objects in an image so as to overcome the above-described drawbacks.

SUMMARY OF THE INVENTION

The present invention is directed to overcoming one or more of the problems set forth above. Briefly summarized, according to one aspect of the present invention, the invention is directed to a computer program product for locating first and second objects each having substantially the same physical characteristics, and the ratio of the distance between the first and second objects and the size of each object is substantially invariant, the computer program product comprising: a computer readable storage medium having a computer program stored thereon for performing the steps of: (a) displaying a digital image on a graphical user interface; (b) inputting to the interface an approximate position of each object for forming initial input positions; (c) determining an estimate size of each object based on the distance obtained from the initial input positions of the first and second objects; (d) forming a first searching window for the first object; the center of the first window is determined by the input position of the first object and the size of the first window is determined by the estimate size of the first object; (e) reiteratively positioning a template on the first search window for determining a location that gives a desired match of the first object relative to the template; (f) forming a second searching window for the second object; the center of the second window is determined by the input position of the second object and the size of the second window is determined by the estimate size of the second object; and (g) reiteratively positioning a template on the second search window for determining a location that gives a desired match of the second object relative to the template.

It is an object of the present invention to provide a method of finding objects in an image which overcomes the above-described drawbacks.

It is also an object of the present invention to provide a method of finding objects in an image based on only initial user-identified positions for each object to be identified.

It is a further object of the present invention to provide a method of estimating the physical size of the objects to be found.

It is still a further object of the present invention to provide a method of estimating the physical orientation of the objects to be found.

It is an advantage of the present invention to provide an efficient method of locating objects in an image.

It is a feature of the present invention to determine an estimated size of each object based on the distance obtained from the initial user-identified input positions of the first and second objects.

It is a feature of the present invention to determine an estimated orientation of each object based on the angle obtained from the initial user-identified input positions of the first and second objects.

It is a feature of the present invention to determine a pair (or a group) of objects based on the a plurality of figures of merit determined based on prior knowledge about the relationship between the first and second objects.

BRIEF DESCRIPTION OF THE DRAWINGS

FIG. 2b is a detailed diagram illustrating the zone-based cross-correlation process;

DETAILED DESCRIPTION OF THE INVENTION

In the following description, the present invention will be described in the preferred embodiment as a software program. Those skilled in the art will readily recognize that the equivalent of such software may also be constructed in hardware.

Still further, as used herein, computer readable storage medium may comprise, for example; magnetic storage media such as a magnetic disk (such as a floppy disk) or magnetic tape; optical storage media such as an optical disc, optical tape, or machine readable bar code; solid state electronic storage devices such as random access memory (RAM), or read only memory (ROM); or any other physical device or medium employed to store a computer program.

Figure 1:
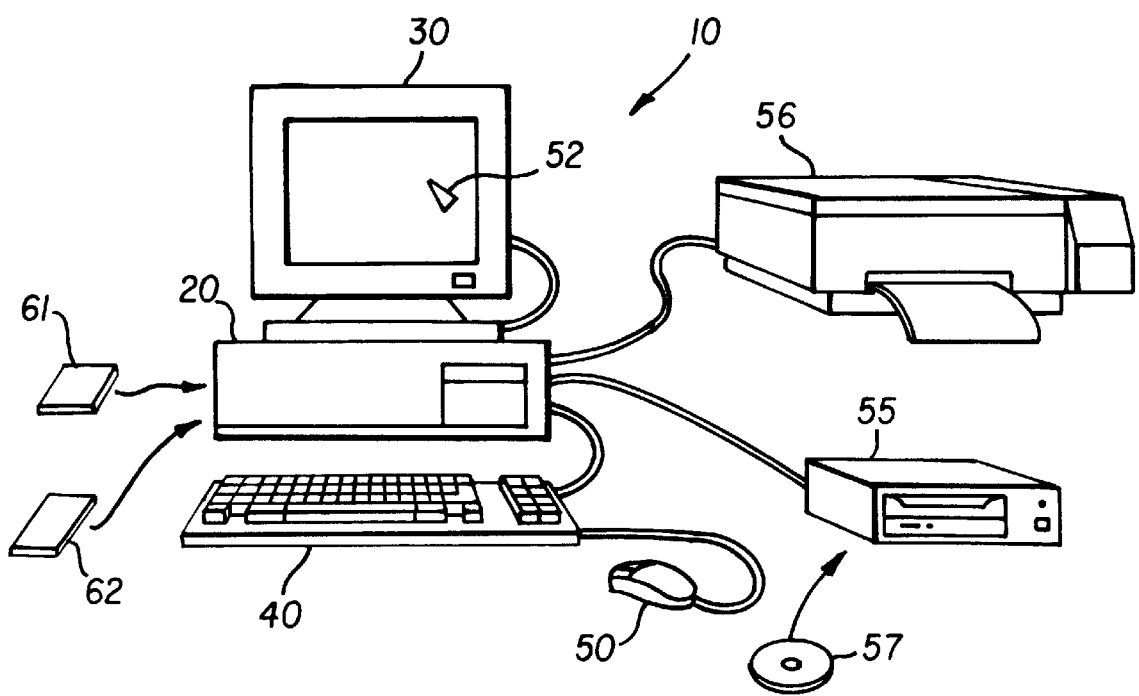
FIG. 1 is a perspective view of a computer system for implementing the present invention.

Referring to FIG. 1, there is illustrated a computer system 10 for implementing the present invention. Although the computer system 10 is shown for the purpose of illustrating a preferred embodiment, the present invention is not limited to the computer system 10 shown, but may be used on any electronic processing system. The computer system 10 includes a microprocessor based unit 20 for receiving and processing software programs and for performing other processing functions. A touch screen display 30 is electrically connected to the microprocessor based unit 20 for displaying user related information associated with the software, and for receiving user input via touching the screen. A keyboard 40 is also connected to the microprocessor based unit 20 for permitting a user to input information to the software. As an alternative to using the keyboard 40 for input, a mouse 50 may be used for moving a selector 52 on the display 30 and for selecting an item on which the selector 52 overlays, as is well known in the art.

A compact disk-read only memory (CD-ROM) 55 is connected to the microprocessor based unit 20 for receiving software programs and for providing a means of inputting the software programs and other information to the microprocessor based unit 20 via a compact disk 57, which typically includes a software program. In addition, a floppy disk 61 may also include a software program, and is inserted into the microprocessor based unit 20 for inputting the software program. Still further, the microprocessor based unit 20 may be programmed, as is well know in the art, for storing the software program internally. A printer 56 is connected to the microprocessor based unit 20 for printing a hardcopy of the output of the computer system 10.

Images may also be displayed on the display 30 via a personal computer card (PC card) 62 or, as it was formerly known, a personal computer memory card international association card (PCMCIA card) which contains digitized images electronically embodied the card 62. The PC card 62 is ultimately inserted into the microprocessor based unit 20 for permitting visual display of the image on the display 30.

Figure 2A:
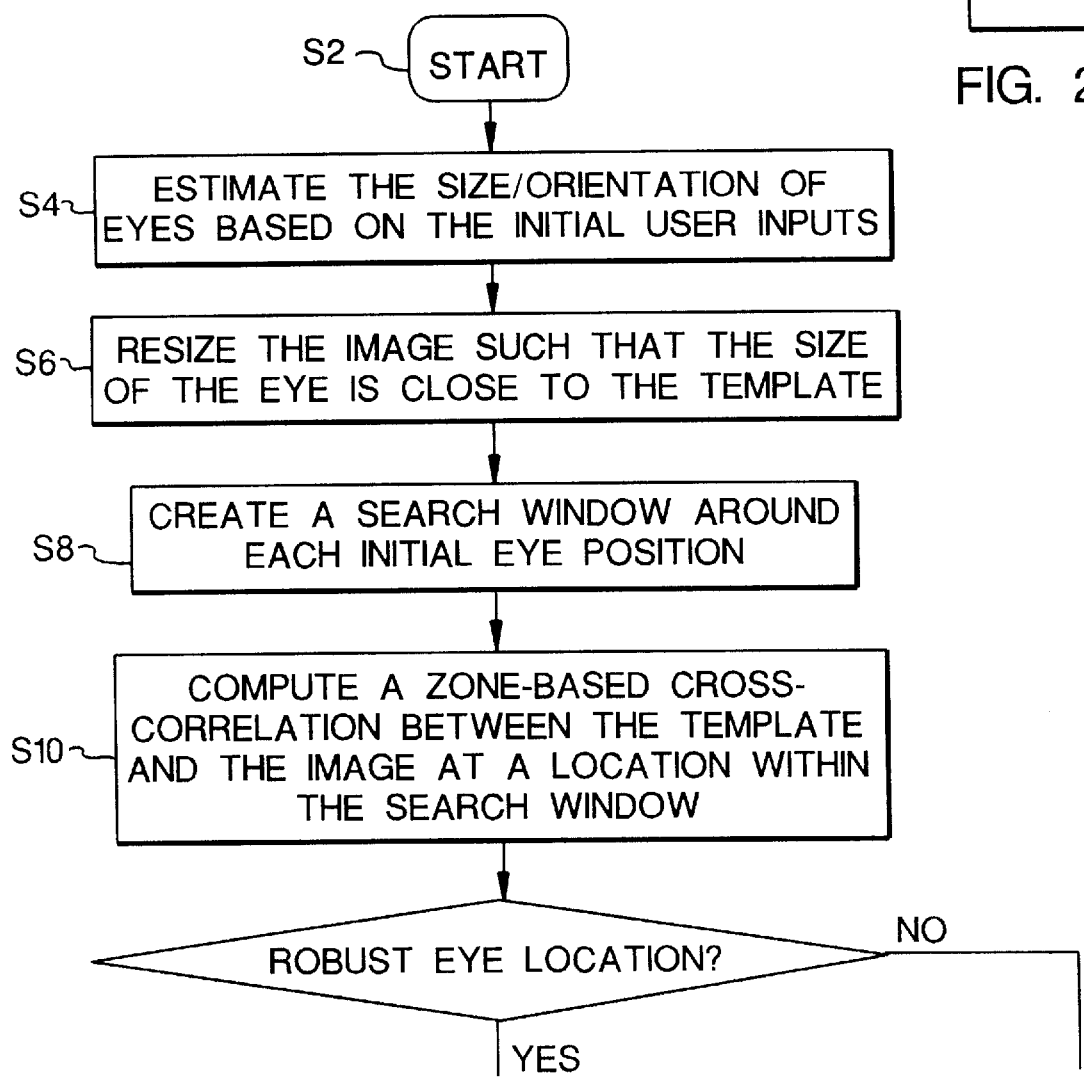
FIG. 2a is a flowchart illustrating the matching procedure used by the present invention.

Referring to FIG. 2a, there is illustrated a flowchart of a software program of the present invention. The program is initiated S2 and an image is displayed on the monitor 30. The user touches the screen twice for identifying the general locations of two eyes, human eyes in the preferred embodiment although other animal eyes may also be applicable. The program receives the location data and then determines a program estimated size of the eyes S4 by the following equation, which is graphically illustrated in FIG. 4:

$$s = d/1.618$$

where d is the distance in pixels between the two user identified locations of the eyes and s is the estimate size, or length, of the eye in pixels.

Figure 4:
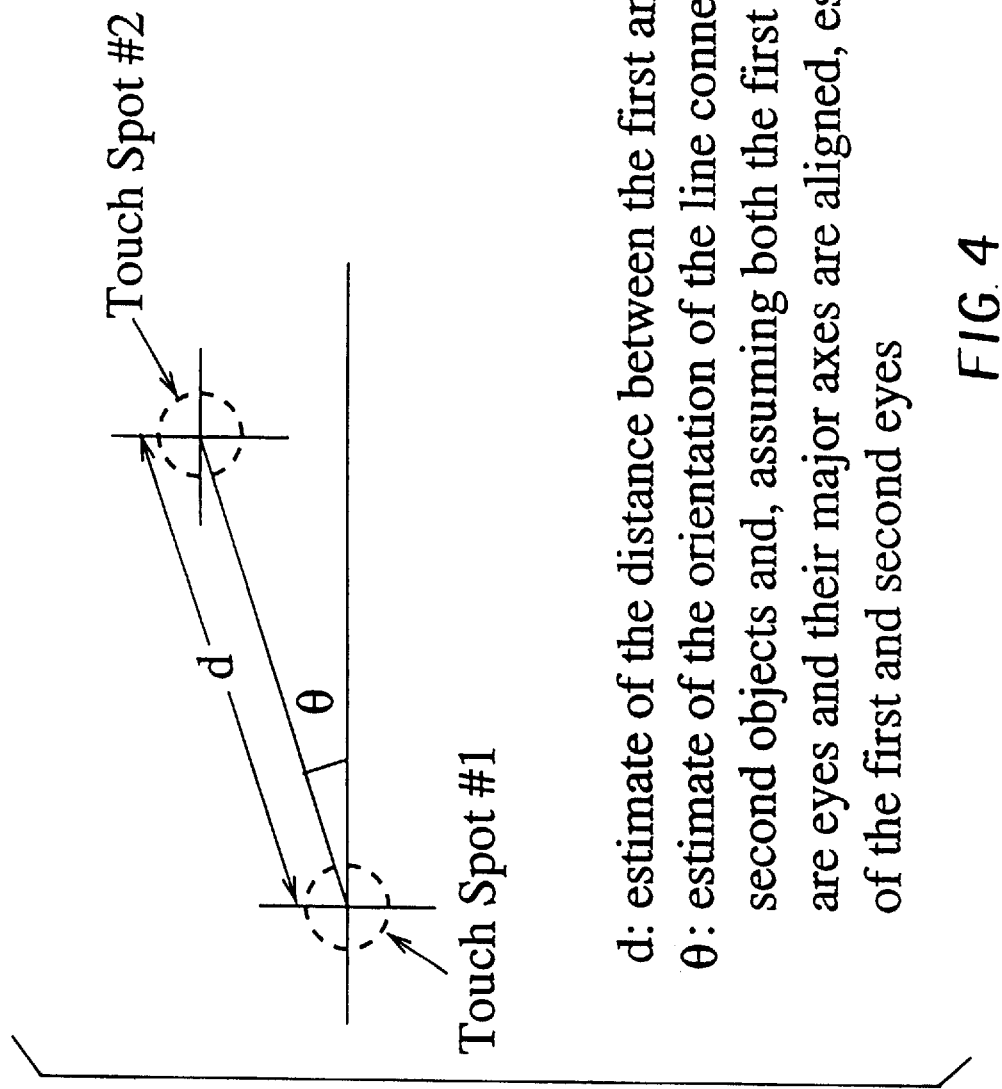
FIG. 4 is an illustration of obtaining estimates of size and orientation of the objects.

An estimated angular orientation of the eye is also generated from the two user-identified touch spots S4, as illustrated in FIG. 4. The assumption is that the two eyes are aligned and therefore the orientation of each eye is approximately the same as the orientation of the line connecting the two eyes. This estimated angle, denoted by $\theta$, is between a line between the two touch spots and a horizontal line through one of the touch spots, preferably the leftwardly touch spot.

Figure 3:
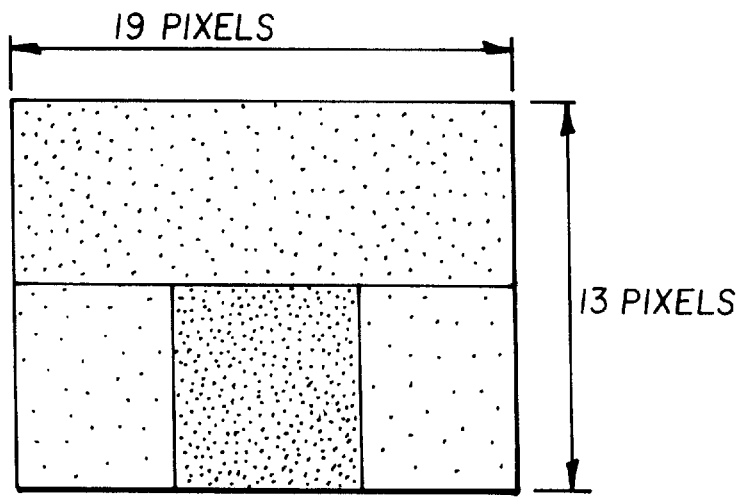
FIG. 3 is a view of the zone partition of the template of the present invention.

It is instructive to note that, from this estimated eye size, the resolution of the displayed image is changed so that the eyes in the image have approximately the same size as the eye template S6. As shown in FIG. 3, the preferred eye template of the present invention includes a resolution of 19 pixels horizontally and 13 pixels vertically. This resolution change, or resizing, enables the eyes in the images to be matched at the same resolution of a template and against the same amount of structural detail, as will be described in detail herein below. An alternative is to design a set of templates with different amounts of detail and keep the resolution of the image unchanged. Such an alternative design is readily accomplished by those skilled in the art.

Figure 5:
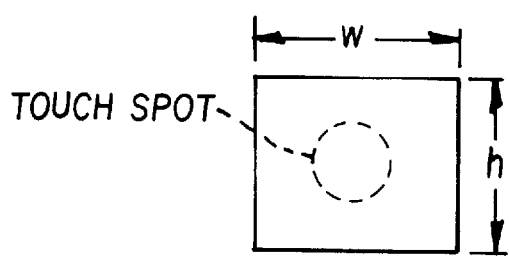
FIG. 5 is an illustration of the determination of the search window.

Referring back to FIG. 2a, a rectangular-shaped search window is formed around one of the user-identified locations S8; the sides of the window are defined as a weighted product of the previously determined estimate size of the eye, as illustrated by the following equation that is graphically illustrated in FIG. 5:

$$w = 0.8(s)$$
$$h = 0.5(s)$$

where w is the width in pixels, h is the height in pixels, and s is the estimate size of the eye from Eq. 1. The user-identified location, or the center of the touch spot, is used as the center of the search window. Alternative designs of the search window are readily accomplished by those skilled in the art.

The cross-correlation between the template and the image is computed by sequentially moving the center pixel of the template to each pixel in the defined search window and performing a specific type of zone-based cross-correlation at each pixel location for determining the center pixel of the eye S10, as will be described in detail below.

Referring briefly to FIG. 2*b*, a zone-based cross-correlation S10 is initialized S10*a*. A template is then retrieved and normalized S10*b*, if it is not already stored in a normalized state. Referring briefly to FIG. 3, the template is preferably generated from sampling a plurality of eyes and relating their corresponding pixel values, for example by taking the average values at each pixel location. The template is then partitioned into four sub-regions that represent the eyelid, iris, and the two corners of the eye. To normalize the template, the average pixel value for the entire template image is subtracted from each pixel value and the resulting pixel value is divided by the standard deviation of the entire template image for obtaining a normalized pixel value. The resulting template therefore has a mean value of zero and a unit variance.

Referring back to FIG. 2*b*, with the center of the template at the pixel location of interest, the zone-based cross-correlation includes, first, extracting a block from the image with its center at the current pixel and its size/orientation the same as the template S10*c* and normalizing the extracted image block S10*d*. Compute the cross-correlation between each sub-region of the extracted block and its counterpart in the template with the pixel of the image at the center of the sub-region S10*e*, hereinafter referred to as a zone-based correlation. If the cross-correlation for each sub-zone meets or exceeds a predetermined threshold, preferably 0.5, cross-correlation is performed with the entire template to the same image pixels of interest S10*f*, hereinafter referred to as a complete correlation. If a threshold, preferably 0.7, is again met, the program temporarily stores the correlation value and the size/orientation of the template in a buffer S10*h*. If the cross-correlation for one or more sub-zones fails the threshold or the cross-correlation for the entire template fails the threshold, the cross-correlation at the pixel of interest is set to "0" and the associated size/orientation are set to "N/A" S10*i*. The program then continues to next pixel location S10*l* for repeating the above-described partitioned and complete cross-correlations, if not the last pixel in the window.

The above-described zone-based correlation and complete correlation are repeated by varying the template for a plurality of sizes around the estimate size (increasing and decreasing) and a plurality of orientations around the estimate orientation (clockwise and counter-clockwise rotation), in order to refine the size and orientation of the eye S10*j*. Such increasing and decreasing of the template size/orientation is readily accomplished by those skilled in the art. This refinement involves the same previously described steps, S10*c*–S10*i*. If one or more complete correlation scores at a pixel location of interest result in a value above the threshold, the program selects the highest correlation value in the temporary buffer and its corresponding template size/orientation used for obtaining the highest value and places them in memory S10*k*. It facilitates understanding to note that the above-described varying of the template size is for further refining the estimated size of the eye from Eq. 1, and the size/orientation of the best-matching template variation in turn indicate the exact size/orientation of the actual eye.

For example, the template size is increased by 10% and decreased by 10%. If the highest correlation value is from the 19×13 resolution template, the estimated size of the eye is not adjusted. If either of the other resolutions produce the highest correlation value, the estimated size of the eye is adjusted so that it matches the template size producing the highest correlation score. Similarly, the template orientation is increased by 10 degrees and decreased by 10 degrees. If one or more complete correlation scores at the pixel location of interest result in a value above the threshold, the program selects the highest correlation value in the temporary buffer and its corresponding template orientation used for obtaining the highest value and places it in memory. If the highest correlation value is from the template at the original estimated orientation, the estimated orientation of the eye is not adjusted. If either of the other orientations produce the highest correlation value, the estimated orientation of the eye is adjusted so that it matches the template orientation producing the highest correlation value.

The program then continues to next pixel location for repeating the above-described zone-based and complete correlation S10*l* after the size and orientation have been refined for the pixel of interest S10*k*.

A search window is then defined for the other eye, and the above-describe processes for the first eye are then repeated for the pixels within this search window.

Figure 6:
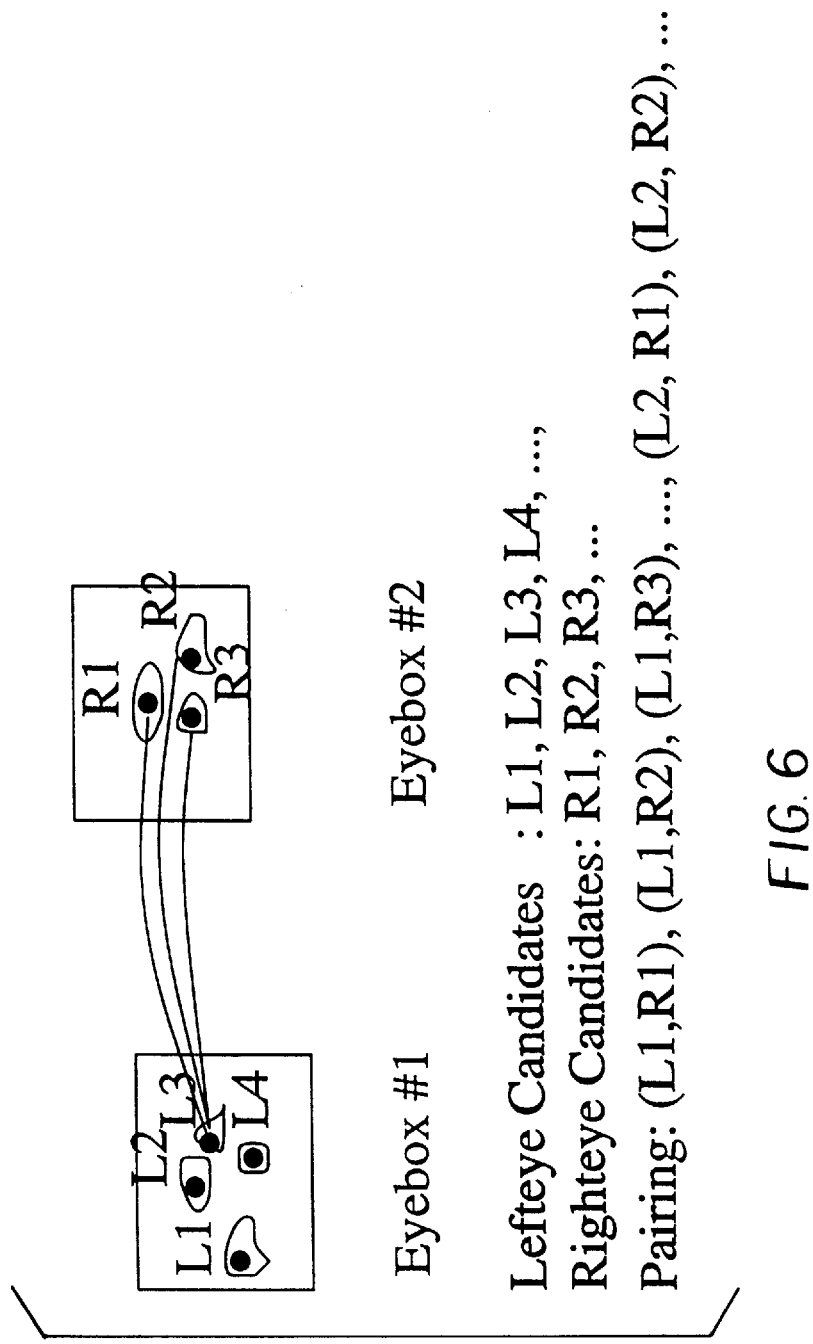
FIG. 6 is an illustration of the pairing of eye candidates.
Figure 7:
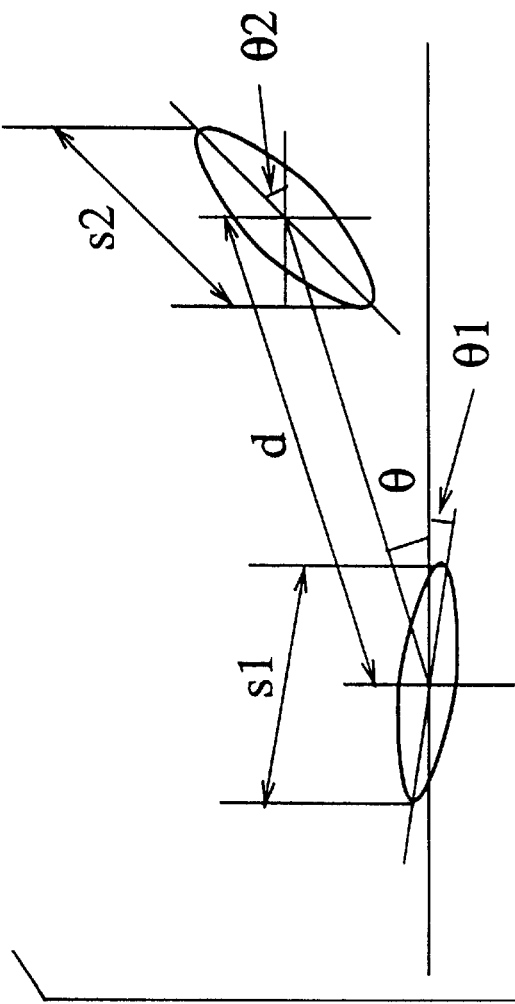
FIG. 7 is an illustration of the verification procedure for the distance between and orientations of the two eyes.

Referring back to FIG. 2*a*, at this point, the user may select the pixel at the location containing the highest correlation score in each window S12, or continue on to verify the most likely candidates from the plurality of peak-correlation points in each window as the center pixel of the eye S14–S20. The peak points are located as the points having a local maximum complete correlation score S14. The locations of these peaks are stored in a buffer S16. Referring to FIG. 6, to verify, a plurality of verification steps are used. The steps involve matching known characteristics about a pair of eyes to all combinations of pixels selected during correlation, and a scoring technique is used (figures-of-merit) to select the most likely pair of locations for the center of the eyes.

The first step is to form all combinations of pixels selected as likely candidates in the two windows S18. In other words, each peak pixel from one window is paired with all the other peak pixels in the other window, as illustrated in FIG. 6. The angular orientation is then determined—the angle between the line formed between the two pixels of interest and a horizontal line through one of the points, preferably the leftwardly pixel. If the angular orientation is not within five degrees of the estimated angular orientation in S10*c*, the pair is eliminated as possible candidates for the center of both eyes. If it is within five degrees of the estimated angular orientation, the pair is stored along with its particular score.

Also, the distance between the two candidate eyes is determined. If the distance is not proportional to the size of the eyes according to the knowledge of the human faces, the pair is eliminated as possible candidates for the center of both eyes. If the proportion is within 20% of the normal proportion, the pair is stored along with its particular score.

Figure 8:
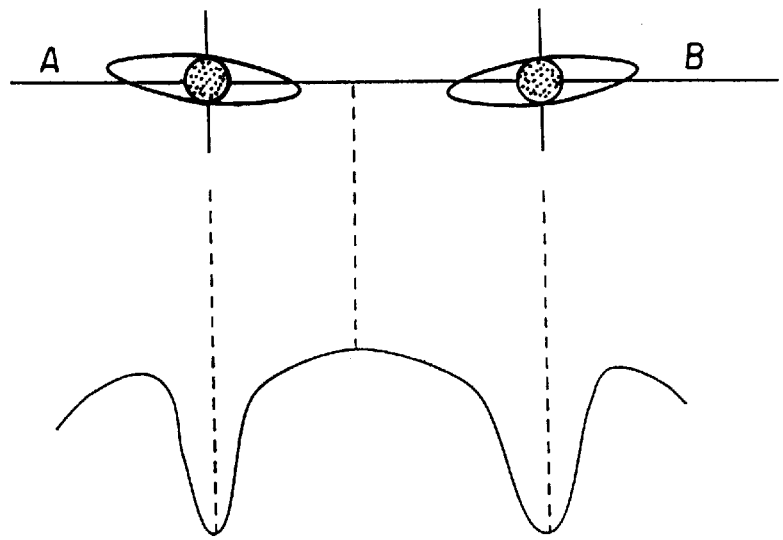
FIG. 8 is an illustration of matching of the eye-to-eye profile.

Referring to FIG. 8, the next step involves taking the pixels along a horizontal line through the two pixels in a possible combination. A graph of code values versus pixel location for each combination will have a shape as illustrated in FIG. 8. If the shape deviates substantially, the pair is eliminated as possible candidates for the center of the eyes; if it does not substantially deviate, the pair is stored along with and its particular score. The deviation is preferably determined by the ratio of the middle peak point and the average of the two valley points, although those skilled in the art can determine other suitable measure of the deviation.

Figure 10:
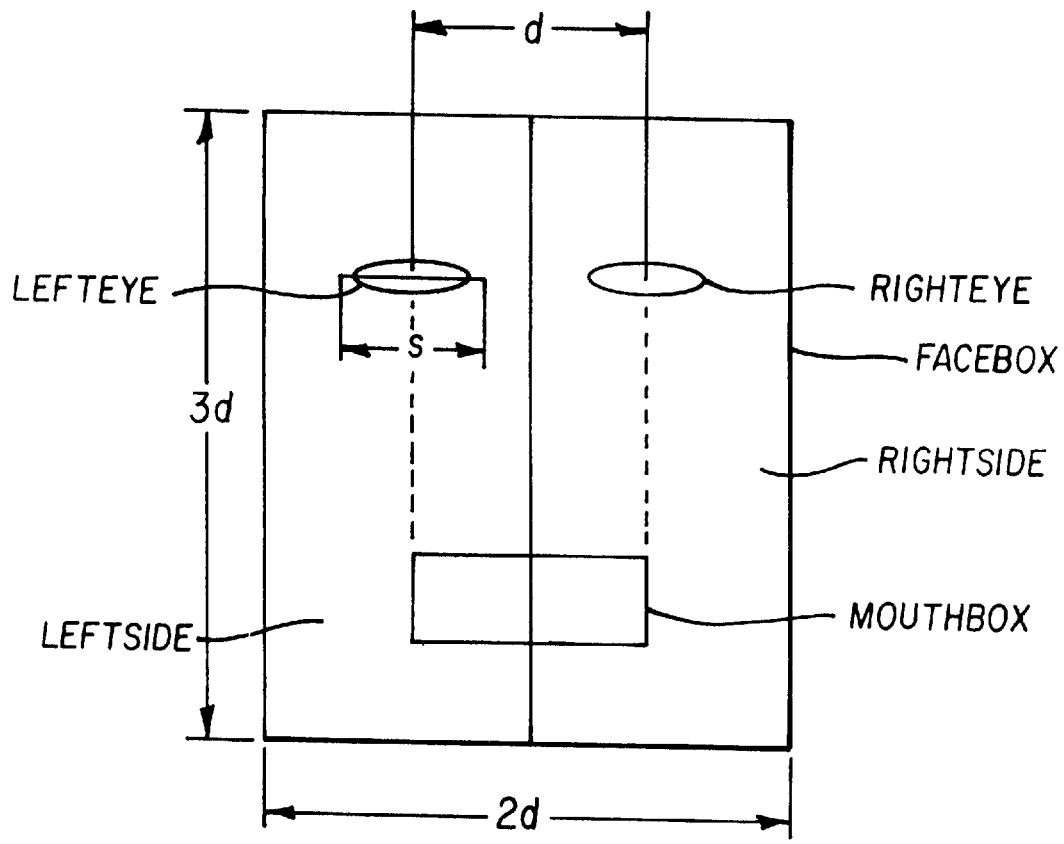
FIG. 10 is an illustration of a symmetry profile.

Referring to FIG. 10, all combinations are then examined for symmetry. This includes taking the distance between all combinations and, at a distance halfway between them, looking for symmetry on both sides of the image through pixels vertically through this halfway point. The region of interest, which contains the face, preferably has a width of twice the distance between the eyes and a height of three times the distance between the eyes. The face region is divided into two halves—the left side and the right ride according to the positions of the eyes. The symmetry is preferably determined by the correlation between the left side and the mirror image of the right side, although those skilled in the art can determine other suitable measure of the symmetry. If symmetry exists for the two sides, the pair and its particular score is again stored; if no symmetry exits, the pair is eliminated as a possible pair of candidates.

Also referring to FIG. 10, the image is next examined for the existence of a mouth at an estimated position. The program searches for three or four parallel lines (edges) within a rectangular box that has a width equal to the distance between the eyes and at a predetermined distance from the pair of pixels being analyzed. This distance is 1.2 times the distance between the candidate pairs, although those skilled in the art may determined other distance values or similar criteria. If the lines (edges) exist, the pair and its particular score are stored; if not, the pair is eliminated as possible candidates.

The combinations are then examined for proximity of the pixel locations to initial input locations. The proximity is measured by distance in pixels. If the proximity holds, the pair and their score are stored; if not, the pair is eliminated as possible candidates.

The combinations are then examined for combined correlation of the two candidates. The combined correlation is the sum of the complete correlation scores at the two candidate locations. If the combined correlation is above a predetermined threshold, the pair and their score are stored; if not, the pair is eliminated as possible candidates.

The most likely pair is the pair that has the highest cumulative scores S20. The final locations of the eyes are determined by this pair S22.

Figure 9:
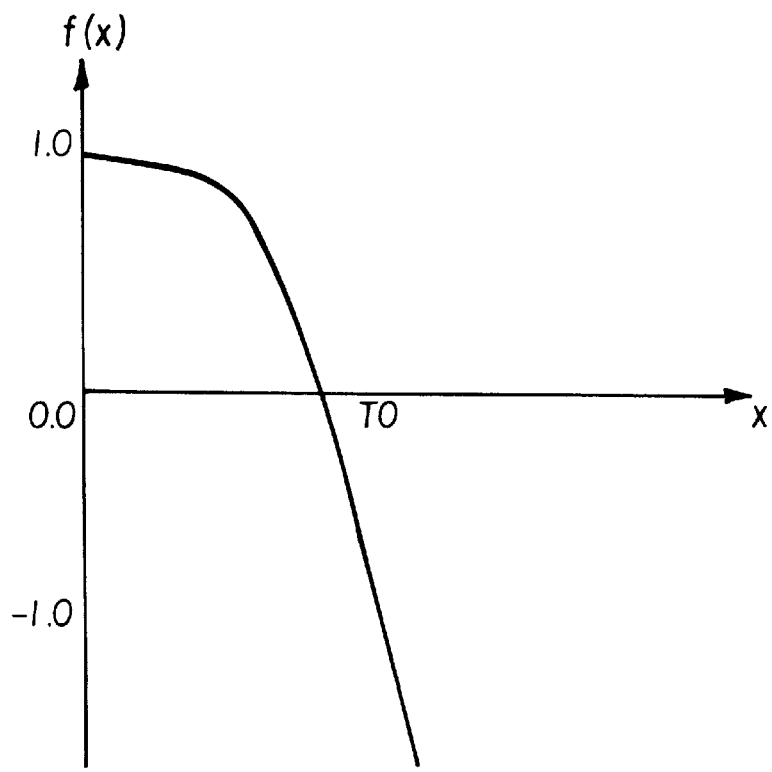
FIG. 9 is an illustration of the scoring function.

The shape of scoring functions for each above-described figure of merit is illustrated in FIG. 9. With this scoring function, even if a combination fails the threshold of a particular figure of merit, it is assigned a large penalty but can still be retained for further consideration. If a figure of merit x is satisfactory with respect to the threshold T0, the output of the scoring function, which is the input to the score accumulator, is close to a normalized maximum value of 1.0. If x fails the threshold, a increasing amount of penalty is accessed depending on how badly x fails. The advantage of using such a scoring function is improved robustness if a candidate barely fails the threshold but turns out to have the highest cumulative score.

If the image is in a standard format such as a passport format, the locations of the eyes are approximately within a confined area in the image. The initial positions of the eyes can be determined according to the knowledge about the image format without a need for user input via a graphic interface.

A computer program written in C++ for performing the steps of the present invention is contained in Appendix A.

The invention has been described with reference to a preferred embodiment. However, it will be appreciated that variations and modifications can be effected by a person of ordinary skill in the art without departing from the scope of the invention.

PARTS LIST

10 computer system
20 microprocessor based unit
30 touch screen display
40 keyboard
50 mouse
52 overlay
55 CD-ROM
57 compact disk
61 floppy disk

What is claimed is:

1. A computer program product for locating first and second objects each having substantially the same physical characteristics, and the ratio of the distance between the first and second objects and the size of each object is substantially invariant, the computer program product comprising: a computer readable storage medium having a computer program stored thereon for performing the steps of:

(a) displaying a digital image on a graphical user interface;

(b) inputting to the interface an approximate position of each object for forming initial input positions;

(c) determining an estimate size of each object based on the distance obtained from the initial input positions of the first and second objects;

(d) forming a first searching window for the first object; the center of the first window is determined by the input position of the first object and the size of the first window is determined by the estimate size of the first object;

(e) reiteratively positioning a template on the first search window for determining a location that gives a desired match of the first object relative to the template;

(f) forming a second searching window for the second object; the center of the second window is determined by the input position of the second object and the size of the second window is determined by the estimate size of the second object; and (g) reiteratively positioning a template on the second search window for determining a location that gives a desired match of the second object relative to the template.

2. The computer program product as in claim 1, further comprising the step of (h) determining a plurality of locations in each search window that give a desired matching response to the template.

3. The computer program product as in claim 2 further comprising the step of finding the best pair of locations from all possible combinations of identified locations of both the first and second objects.

4. The computer program product as in claim 3, wherein the step of finding best pair of locations includes computing a plurality of figures of merit and determining a pair of locations that give a best combined figure of merit.

5. The computer program product as in claim 4, wherein computing a plurality of figures of merit includes computing individually or in combination an orientation, proximity, combined correlation score, proportion, profile, symmetry or evidence of mouth.

6. The computer program product as in claim 5, wherein the first and second objects are first and second human eyes and wherein computing an orientation includes measuring the difference between the orientation of the line connecting the first and second eyes, and the average orientation of the first and second eyes.

7. The computer program product as in claim 5, wherein computing a proximity includes measuring proximity of the first and second objects to the initial input positions, respectively.

8. The computer program product as in claim 5, wherein computing a combined correlation score includes summing up the individual correlation scores obtained from the matching obtained in step (e1).

9. The computer program product as in claim 5, wherein the first and second objects are first and second human eyes and wherein computing a proportion includes computing a distance between the first and second eyes for satisfying an anthropological prior model.

10. The computer program product as in claim 5, wherein the first and second objects are first and second human eyes and wherein computing the profile includes pre-determining a model of the eye-to-eye profile and determining an actual profile from the image and computing a goodness-of-fit between the actual profile and the model profile.

11. The computer program product as in claim 5, wherein the first and second objects are first and second human eyes and wherein computing the symmetry includes computing a symmetry between first and second halves of a face window determined by the eye locations.

12. The computer program product as in claim 5, wherein the first and second objects are first and second human eyes and wherein computing the evidence of mouth includes computing strength and orientation of edges within a mouth window determined by the eye locations.

13. The computer program product as in claim 2 further comprising the step of normalizing the template for maximizing robustness of matching.

14. The computer program product as in claim 2 further comprising the step of creating a image block of the same size and orientation as the template.

15. The computer program product as in claim 14 further comprising the step of normalizing the image block for maximizing robustness of matching.

16. The computer program product as in claim 14 further comprising the step of extracting individual sub-zones in both the template and the image block, and performing cross-correlation for each corresponding sub-zone.

17. The computer program product as in claim 14 further comprising the step of computing the overall cross-correlation score for the image block if the cross-correlation score for each sub-zone exceeds a threshold.

18. The computer program product as in claim 2 further comprising the step of identifying the locations that give locally maximum cross-correlation score.

19. A computer program product for locating first and second objects each having substantially the same physical characteristics, and the ratio of the distance between the first and second objects and the size of each object is substantially invariant, the computer program product comprising: a computer readable storage medium having a computer program stored thereon for performing the steps of:

(a) displaying a digital image on a graphical user interface;

(b) inputting to the interface an approximate position of each object for forming initial input positions;

(c) determining an estimate orientation of each object based on an angle derived from the initial input positions of the first and second objects;

(d) forming a first searching window for the first object; the center of the first window is determined by the initial input position of the first object and the size of the first window is determined by the estimate size of the first object;

(e) reiteratively positioning a template on the first search window for determining a location that gives a desired match of the first object relative to the template; and (f) forming a second searching window for the first object; the center of the second window is determined by the input position of the first object and the size of the second window is determined by the estimate size of the first object;

(g) reiteratively positioning a template on the second search window for determining a location that gives a desired match of the first object relative to the template.

20. The computer program product as in claim 19 further comprising determining a plurality of locations that give a desired matching response to the template.

21. The computer program product as in claim 19 further comprising the step of finding the best pair of locations from all possible combinations of identified locations of both the first and second objects.

22. The computer program product as in claim 21, wherein the step of finding best pair of locations includes computing a plurality of figures of merit and determining a pair of locations that give a best combined figure of merit.

23. The computer program product as in claim 22, wherein computing a plurality of figures of merit includes computing individually or in combination an orientation, proximity, combined correlation score, proportion, profile, symmetry or evidence of mouth.

24. The computer program product as in claim 23, wherein the first and second objects are first and second human eyes and wherein computing an orientation includes measuring the difference between the orientation of the line connecting the first and second eyes, and the average orientation of the first and second eyes.

25. The computer program product as in claim 23, wherein computing a proximity includes measuring proximity of the first and second objects to the initial input positions, respectively.

26. The computer program product as in claim 23, wherein computing a combined correlation score includes summing up the individual correlation scores obtained from the matching obtained in step (e1).

27. The computer program product as in claim 23, wherein the first and second objects are first and second human eyes and wherein computing a proportion includes computing a distance between the first and second eyes for satisfying an anthropological prior model.

28. The computer program product as in claim 23, wherein the first and second objects are first and second human eyes and wherein computing the profile includes pre-determining a model of the eye-to-eye profile and determining an actual profile from the image and computing a goodness-of-fit between the actual profile and the model profile.

29. The computer program product as in claim 23, wherein the first and second objects are first and second human eyes and wherein computing the symmetry includes computing a symmetry between first and second halves of a face window determined by the eye locations.

30. The computer program product as in claim 23, wherein the first and second objects are first and second human eyes and wherein computing the evidence of mouth includes computing strength and orientation of edges within a mouth window determined by the eye locations.

31. The computer program product as in claim 20 further comprising the step of normalizing the template for maximizing robustness of matching.

32. The computer program product as in claim 20 further comprising the step of creating a image block of the same size and orientation as the template.

33. The computer program product as in claim 32 further comprising the step of normalizing the image block for maximizing robustness of matching.

34. The computer program product as in claim 32 further comprising the step of extracting individual sub-zones in both the template and the image block, and performing cross-correlation for each corresponding sub-zone.

35. The computer program product as in claim 32 further comprising the step of computing the overall cross-correlation score for the image block if the cross-correlation score for each sub-zone exceeds a threshold.

36. The computer program product as in claim 20 further comprising the step of identifying the locations that give locally maximum cross-correlation score.

37. A computer program product for locating first and second objects each having substantially the same physical characteristics, and the ratio of the distance between the first and second objects and the size of each object is substantially invariant, the computer program product comprising: a computer readable storage medium having a computer program stored thereon for performing the steps of:

(a) displaying a digital image on a graphical user interface;

(b) inputting to the interface an approximate position of each object for forming initial input positions;

(c) determining an estimate orientation of each object based on an angle derived from the initial input positions of the first and second objects;

(d) determining an estimate size of each object based on the distance obtained from the initial input positions of the first and second objects;

(e) forming a searching window for the first object; the center of the window is determined by the input position of the first object and the size of the window is determined by the estimate size of the first object;

(f) reiteratively positioning a template on the search window for determining a location that gives a desired match of the first object relative to the template; and (g) repeating steps (e) and (f) for the second object.

38. The computer program product as in claim 37, further comprising the step of (h) determining a plurality of locations in each search window that give a desired matching response to the template.

39. The computer program product as in claim 38 further comprising the step of finding the best pair of locations from all possible combinations of identified locations of both the first and second objects.

40. The computer program product as in claim 39, wherein the step of finding best pair of locations includes computing a plurality of figures of merit and determining a pair of locations that give a best combined figure of merit.

41. The computer program product as in claim 40, wherein computing a plurality of figures of merit includes computing individually or in combination an orientation, proximity, combined correlation score, proportion, profile, symmetry or evidence of mouth.

42. The computer program product as in claim 41, wherein the first and second objects are first and second human eyes and wherein computing an orientation includes measuring the difference between the orientation of the line connecting the first and second eyes, and the average orientation of the first and second eyes.

43. The computer program product as in claim 41, wherein computing a proximity includes measuring proximity of the first and second objects to the initial input positions, respectively.

44. The computer program product as in claim 41, wherein computing a combined correlation score includes summing up the individual correlation scores obtained from the matching obtained in step (e1).

45. The computer program product as in claim 41, wherein the first and second objects are first and second human eyes and wherein computing a proportion includes computing a distance between the first and second eyes for satisfying an anthropological prior model.

46. The computer program product as in claim 41, wherein the first and second objects are first and second human eyes and wherein computing the profile includes pre-determining a model of the eye-to-eye profile and determining an actual profile from the image and computing a goodness-of-fit between the actual profile and the model profile.

47. The computer program product as in claim 41, wherein the first and second objects are first and second human eyes and wherein computing the symmetry includes computing a symmetry between first and second halves of a face window determined by the eye locations.

48. The computer program product as in claim 41, wherein the first and second objects are first and second human eyes and wherein computing the evidence of mouth includes computing strength and orientation of edges within a mouth window determined by the eye locations.

49. The computer program product as in claim 38 further comprising the step of normalizing the template for maximizing robustness of matching.

50. The computer program product as in claim 38 further comprising the step of creating a image block of the same size and orientation as the template.

51. The computer program product as in claim 50 further comprising the step of normalizing the image block for maximizing robustness of matching.

52. The computer program product as in claim 50 further comprising the step of extracting individual sub-zones in both the template and the image block, and performing cross-correlation for each corresponding sub-zone.

53. The computer program product as in claim 50 further comprising the step of computing the overall cross-correlation score for the image block if the cross-correlation score for each sub-zone exceeds a threshold.

54. The computer program product as in claim 38 further comprising the step of identifying the locations that give locally maximum cross-correlation score.

55. A computer program product for locating first and second objects in an image each object having substantially the same physical characteristics, and the ratio of the distance between the first and second objects and the size of each object is substantially invariant, the computer program product comprising: a computer readable storage medium having a computer program stored thereon for performing the steps of:

(a) displaying a digital image on a graphical user interface;

(b) estimating an approximate position of each object for forming initial input positions based on a format of the image;

(c) determining an estimate size of each object based on the distance obtained from the initial input positions of the first and second objects;

(d) forming a first searching window for the first object; the center of the first window is determined by the input position of the first object and the size of the first window is determined by the estimate size of the first object;

(e) reiteratively positioning a template on the first search window for determining a location that gives a desired match of the first object relative to the template;

(f) forming a second searching window for the second object; the center of the second window is determined by the input position of the second object and the size of the second window is determined by the estimate size of the second object; and (g) reiteratively positioning a template on the second search window for determining a location that gives a desired match of the second object relative to the template.

56. The computer program product as in claim 55, further comprising the step of (h) determining a plurality of locations in each search window that give a desired matching response to the template.

57. The computer program product as in claim 56 further comprising the step of finding the best pair of locations from all possible combinations of identified locations of both the first and second objects.

58. The computer program product as in claim 57, wherein the step of finding best pair of locations includes computing a plurality of figures of merit and determining a pair of locations that give a best combined figure of merit.

59. The computer program product as in claim 58, wherein computing a plurality of figures of merit includes computing individually or in combination an orientation, proximity, combined correlation score, proportion, profile, symmetry or evidence of mouth.

60. The computer program product as in claim 59, wherein the first and second objects are first and second human eyes and wherein computing an orientation includes measuring the difference between the orientation of the line connecting the first and second eyes, and the average orientation of the first and second eyes.

61. The computer program product as in claim 59, wherein computing a proximity includes measuring proximity of the first and second objects to the initial input positions, respectively.

62. The computer program product as in claim 59, wherein computing a combined correlation score includes summing up the individual correlation scores obtained from the matching obtained in step (e1).

63. The computer program product as in claim 59, wherein the first and second objects are first and second human eyes and wherein computing a proportion includes computing a distance between the first and second eyes for satisfying an anthropological prior model.

64. The computer program product as in claim 59, wherein the first and second objects are first and second human eyes and wherein computing the profile includes pre-determining a model of the eye-to-eye profile and determining an actual profile from the image and computing a goodness-of-fit between the actual profile and the model profile.

65. The computer program product as in claim 59, wherein the first and second objects are first and second human eyes and wherein computing the symmetry includes computing a symmetry between first and second halves of a face window determined by the eye locations.

66. The computer program product as in claim 59, wherein the first and second objects are first and second human eyes and wherein computing the evidence of mouth includes computing strength and orientation of edges within a mouth window determined by the eye locations.

67. The computer program product as in claim 56 further comprising the step of normalizing the template for maximizing robustness of matching.

68. The computer program product as in claim 56 further comprising the step of creating a image block of the same size and orientation as the template.

69. The computer program product as in claim 68 further comprising the step of normalizing the image block for maximizing robustness of matching.

70. The computer program product as in claim 68 further comprising the step of extracting individual sub-zones in both the template and the image block, and performing cross-correlation for each corresponding sub-zone.

71. The computer program product as in claim 68 further comprising the step of computing the overall cross-correlation score for the image block if the cross-correlation score for each sub-zone exceeds a threshold.

72. The computer program product as in claim 56 further comprising the step of identifying the locations that give locally maximum cross-correlation score.

73. A computer program product for locating first and second objects each having substantially the same physical characteristics, and the ratio of the distance between the first and second objects and the size of each object is substantially invariant, the computer program product comprising: a computer readable storage medium having a computer program stored thereon for performing the steps of:

(a) displaying a digital image on a graphical user interface;

(b) estimating an approximate position of each object for forming initial input positions;

(c) determining an estimate orientation of each object based on an angle derived from the initial input positions of the first and second objects;

(d) forming a first searching window for the first object; the center of the first window is determined by the initial input position of the first object and the size of the first window is determined by the estimate size of the first object;

(e) reiteratively positioning a template on the first search window for determining a location that gives a desired match of the first object relative to the template; and (f) forming a second searching window for the first object; the center of the second window is determined by the input position of the first object and the size of the second window is determined by the estimate size of the first object;

(g) reiteratively positioning a template on the second search window for determining a location that gives a desired match of the first object relative to the template.

74. The computer program product as in claim 73 further comprising determining a plurality of locations that give a desired matching response to the template.

75. The computer program product as in claim 73 further comprising the step of finding the best pair of locations from all possible combinations of identified locations of both the first and second objects.

76. The computer program product as in claim 75, wherein the step of finding best pair of locations includes computing a plurality of figures of merit and determining a pair of locations that give a best combined figure of merit.

77. The computer program product as in claim 76, wherein computing a plurality of figures of merit includes computing individually or in combination an orientation, proximity, combined correlation score, proportion, profile, symmetry or evidence of mouth.

78. The computer program product as in claim 77, wherein the first and second objects are first and second human eyes and wherein computing an orientation includes measuring the difference between the orientation of the line connecting the first and second eyes, and the average orientation of the first and second eyes.

79. The computer program product as in claim 77, wherein computing a proximity includes measuring proximity of the first and second objects to the initial input positions, respectively.

80. The computer program product as in claim 77, wherein computing a combined correlation score includes summing up the individual correlation scores obtained from the matching obtained in step (e1).

81. The computer program product as in claim 77, wherein the first and second objects are first and second human eyes and wherein computing a proportion includes computing a distance between the first and second eyes for satisfying an anthropological prior model.

82. The computer program product as in claim 77, wherein the first and second objects are first and second human eyes and wherein computing the profile includes pre-determining a model of the eye-to-eye profile and determining an actual profile from the image and computing a goodness-of-fit between the actual profile and the model profile.

83. The computer program product as in claim 77, wherein the first and second objects are first and second human eyes and wherein computing the symmetry includes computing a symmetry between first and second halves of a face window determined by the eye locations.

84. The computer program product as in claim 77, wherein the first and second objects are first and second human eyes and wherein computing the evidence of mouth includes computing strength and orientation of edges within a mouth window determined by the eye locations.

85. The computer program product as in claim 74 further comprising the step of normalizing the template for maximizing robustness of matching.

86. The computer program product as in claim 74 further comprising the step of creating a image block of the same size and orientation as the template.

87. The computer program product as in claim 86 further comprising the step of normalizing the image block for maximizing robustness of matching.

88. The computer program product as in claim 87 further comprising the step of extracting individual sub-zones in both the template and the image block, and performing cross-correlation for each corresponding sub-zone.

89. The computer program product as in claim 87 further comprising the step of computing the overall cross-correlation score for the image block if the cross-correlation score for each sub-zone exceeds a threshold.

90. The computer program product as in claim 75 further comprising the step of identifying the locations that give locally maximum cross-correlation score.

91. A computer program product for locating first and second objects in an image each object having substantially the same physical characteristics, and the ratio of the distance between the first and second objects and the size of each object is substantially invariant, the computer program product comprising: a computer readable storage medium having a computer program stored thereon for performing the steps of:

(a) displaying a digital image on a graphical user interface;

(b) estimating an approximate position of each object for forming initial input positions based on a format of the image;

(c) determining an estimate orientation of each object based on an angle derived from the initial input positions of the first and second objects;

(d) determining an estimate size of each object based on the distance obtained from the initial input positions of the first and second objects;

(e) forming a searching window for the first object; the center of the window is determined by the input position of the first object and the size of the window is determined by the estimate size of the first object;

(f) reiteratively positioning a template on the search window for determining a location that gives a desired match of the first object relative to the template; and (g) repeating steps (e) and (f) for the second object.

92. The computer program product as in claim 91, further comprising the step of (h) determining a plurality of locations in each search window that give a desired matching response to the template.

93. The computer program product as in claim 92 further comprising the step of finding the best pair of locations from all possible combinations of identified locations of both the first and second objects.

94. The computer program product as in claim 93, wherein the step of finding best pair of locations includes computing a plurality of figures of merit and determining a pair of locations that give a best combined figure of merit.

95. The computer program product as in claim 93, wherein computing a plurality of figures of merit includes computing individually or in combination an orientation, proximity, combined correlation score, proportion, profile, symmetry or evidence of mouth.

96. The computer program product as in claim 95, wherein the first and second objects are first and second human eyes and wherein computing an orientation includes measuring the difference between the orientation of the line connecting the first and second eyes, and the average orientation of the first and second eyes.

97. The computer program product as in claim 95, wherein computing a proximity includes measuring proximity of the first and second objects to the initial input positions, respectively.

98. The computer program product as in claim 95, wherein computing a combined correlation score includes summing up the individual correlation scores obtained from the matching obtained in step (e1).

99. The computer program product as in claim 95, wherein the first and second objects are first and second human eyes and wherein computing a proportion includes computing a distance between the first and second eyes for satisfying an anthropological prior model.

100. The computer program product as in claim 95, wherein the first and second objects are first and second human eyes and wherein computing the profile includes pre-determining a model of the eye-to-eye profile and determining an actual profile from the image and computing a goodness-of-fit between the actual profile and the model profile.

101. The computer program product as in claim 95, wherein the first and second objects are first and second human eyes and wherein computing the symmetry includes computing a symmetry between first and second halves of a face window determined by the eye locations.

102. The computer program product as in claim 95, wherein the first and second objects are first and second human eyes and wherein computing the evidence of mouth includes computing strength and orientation of edges within a mouth window determined by the eye locations.

103. The computer program product as in claim 92 further comprising the step of normalizing the template for maximizing robustness of matching.

104. The computer program product as in claim 92 further comprising the step of creating a image block of the same size and orientation as the template.

105. The computer program product as in claim 104 further comprising the step of normalizing the image block for maximizing robustness of matching.

106. The computer program product as in claim 104 further comprising the step of extracting individual sub-zones in both the template and the image block, and performing cross-correlation for each corresponding sub-zone.

107. The computer program product as in claim 104 further comprising the step of computing the overall cross-correlation score for the image block if the cross-correlation score for each sub-zone exceeds a threshold.

* * * * *